(12) United States Patent
Hsu et al.

(10) Patent No.: US 8,446,387 B2
(45) Date of Patent: May 21, 2013

(54) TOUCH CONTROL SYSTEM WITH MULTI-TOUCH DETECTION FUNCTIONS

(75) Inventors: Chao-Yong Hsu, Changhua County (TW); Shih-Hung Huang, Taoyuan County (TW); Hung-Hsiang Chen, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 403 days.

(21) Appl. No.: 12/965,937

(22) Filed: Dec. 13, 2010

(65) Prior Publication Data

US 2012/0044192 A1 Feb. 23, 2012

(30) Foreign Application Priority Data

Aug. 20, 2010 (TW) .............................. 99127921 A (51) Int. Cl.
*G06F 3/045* (2006.01)
(52) U.S. Cl.
USPC ....................................... 345/174; 178/18.06
(58) Field of Classification Search
USPC .................... 345/173, 174; 178/18.01, 18.03, 178/18.06
See application file for complete search history.

(56) References Cited

U.S. PATENT DOCUMENTS

| 2010/0039405 | A1 | 2/2010 | Chen |
| 2011/0175847 | A1* | 7/2011 | Wang et al. .................... 345/174 |

FOREIGN PATENT DOCUMENTS

| JP | 2005267478 A | 9/2005 |
| JP | 200998942 A | 5/2009 |
| JP | 201039602 A | 2/2010 |
| JP | 2010113717 A | 5/2010 |
| JP | 2010515193 A | 5/2010 |
| JP | 2010186469 A | 8/2010 |
| JP | 2011519458 A | 7/2011 |
| TW | 200933465 | 8/2009 |
| TW | 200947291 | 11/2009 |
| WO | 2008085720 A1 | 7/2008 |
| WO | 2009133559 A2 | 11/2009 |

* cited by examiner

*Primary Examiner* — Regina Liang
(74) *Attorney, Agent, or Firm* — Winston Hsu; Scott Margo (57) ABSTRACT

The touch control system with multi-touch detection functions includes a touch panel, a first transceiver, a second transceiver, and a processor. The first transceiver scans N first sensing lines along a first axis of a touch panel, and detects at least one first sensing line touched by at least one object according to the scanning result. The first transceiver inputs at least one high frequency signal to the at least one first sensing line touched by the at least one object, and the second transceiver inputs M low frequency signals to M second sensing lines along a second axis of the touch panel. The processor receives and detects M feedback signals of the M second sensing lines along the second axis, and determines a position of at least one touch point according to the M feedback signals.

6 Claims, 8 Drawing Sheets

TOUCH CONTROL SYSTEM WITH MULTI-TOUCH DETECTION FUNCTIONS

BACKGROUND OF THE INVENTION

1. Field of the Invention

The present invention is related to a touch control system, and particularly to a touch control system with multi-touch detection functions.

2. Description of the Prior Art

Figure 1:
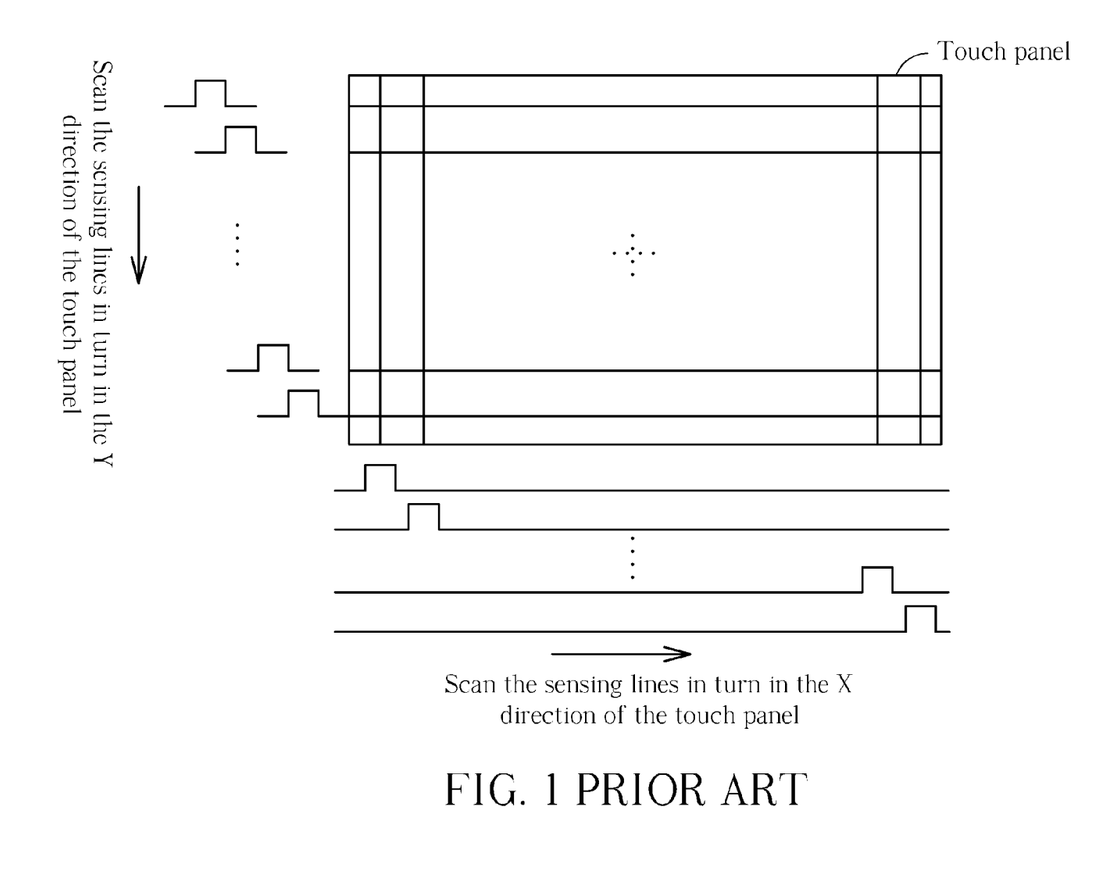
FIG. 1 is a diagram illustrating a method of a self-capacitance touch panel detecting at least one touch point.
Figure 2:
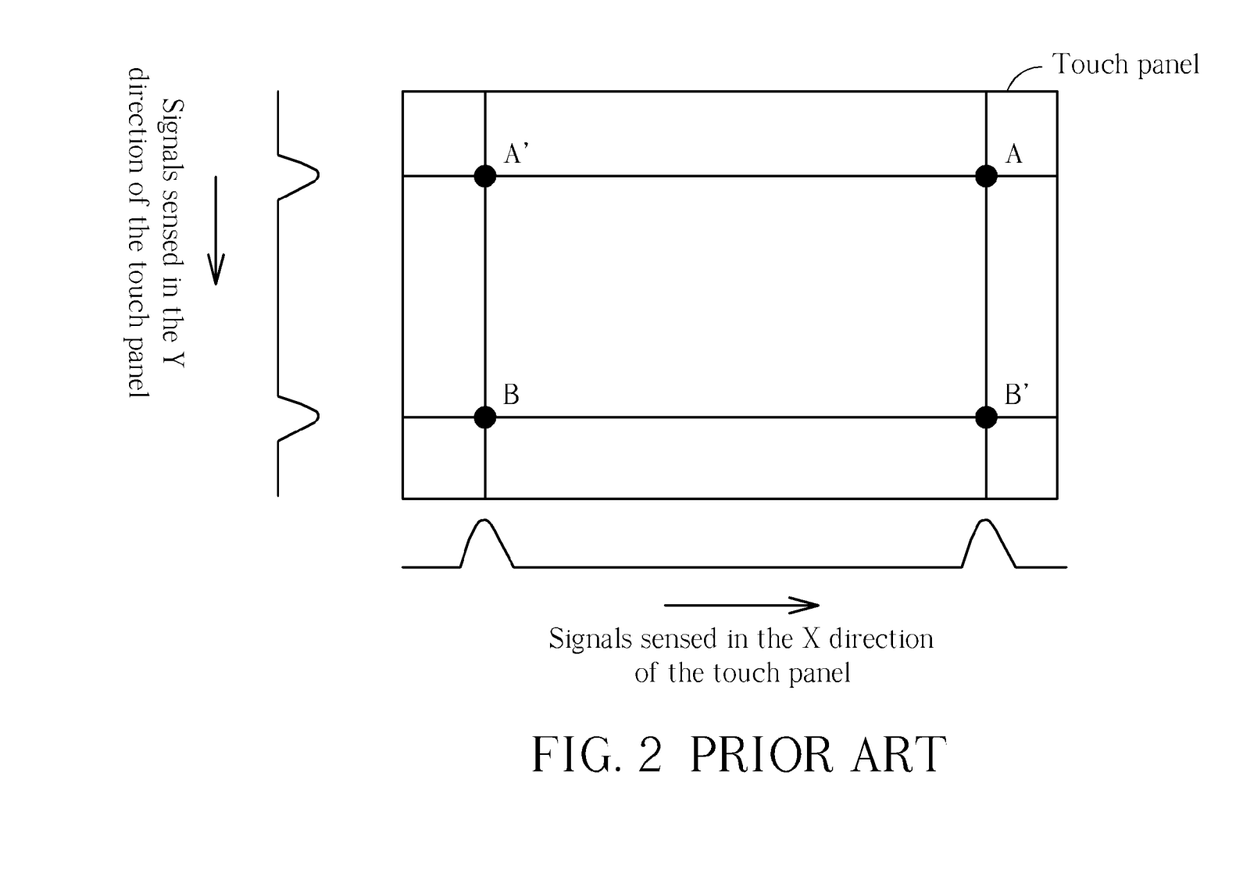
FIG. 2 is a diagram illustrating the self-capacitance touch panel generating a ghost point.

Please refer to FIG. 1. FIG. 1 is a diagram illustrating a method of a self-capacitance touch panel detecting at least one touch point. The method of the self-capacitance touch panel detecting the at least one touch point utilizes voltage scanning signals provided by a driving circuit to scan N sensing lines in turns in an X direction of a touch panel, and then to scan M sensing lines in turns in a Y direction of a touch panel, or utilizes the voltage scanning signals to scan the M sensing lines in turns in the Y direction of the touch panel, and then to scan the N sensing lines in turns in the X direction of the touch panel. A capacitance of a sensing line increases when the sensing line is touched by at least one object, so the sensing line touched by the object can be detected according to a change of a duty cycle of the voltage scanning signal. But, the self-capacitance touch panel may misjudge some touch points when the self-capacitance touch panel is touched by a plurality of touch points. Please refer to FIG. 2. FIG. 2 is a diagram illustrating the self-capacitance touch panel generating a ghost point. As shown in FIG. 2, the self-capacitance touch panel can detect coordinates of both points A, B by scanning the M sensing lines in the Y direction of the touch panel and the N sensing lines in the X direction of the touch panel when two objects touch the points A, B of the touch panel. But, the self-capacitance touch panel can also further detect both coordinates of points A', B', so the points A', B' of the touch panel are ghost points.

Figure 3:
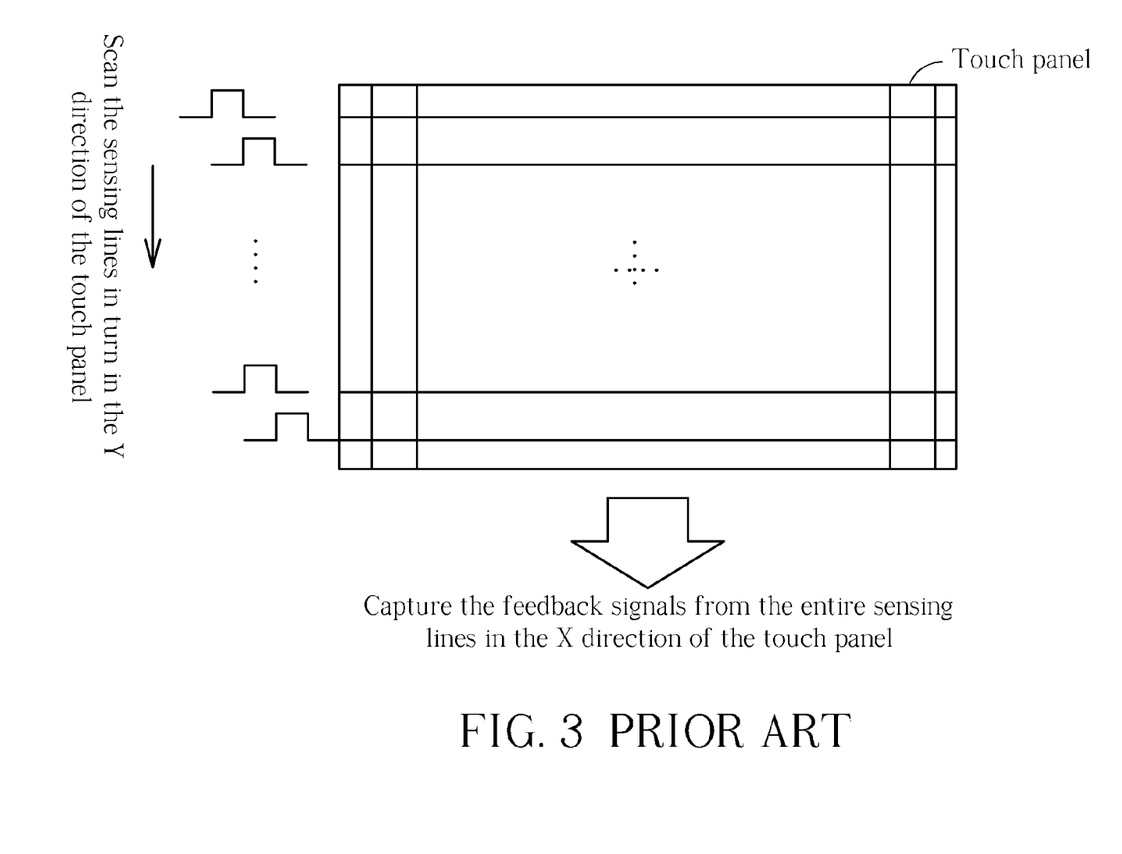
FIG. 3 is a diagram illustrating a method of a mutual capacitance touch panel detecting at least one touch point.

Please refer to FIG. 3. FIG. 3 is a diagram illustrating a method of a mutual capacitance touch panel detecting at least one touch point. The mutual capacitance touch panel can detect positions of a plurality of touch points accurately. The method of the mutual capacitance touch panel detecting the touch points is utilizing voltage scanning signals or current scanning signals to scan sensing lines in turns in an X direction (or a Y direction) of the mutual capacitance touch panel, and then to capture feedback signals from all sensing lines in the Y direction (or the X direction) of the mutual capacitance touch panel. But, a large amount of data is generated by the method of the mutual capacitance touch panel detecting the at least one touch point, and the data must be processed to generate the true touch points. Therefore, the mutual capacitance touch panel can accurately detect the positions of the plurality of touch points, but the mutual capacitance touch panel not only requires massive storage, but also heavy data processing.

SUMMARY OF THE INVENTION

An embodiment of the present invention provides a touch control system with multi-touch detection functions. The touch control system includes a touch panel, a first transceiver, a second transceiver, and a processor. The touch panel is used for being touched by an object, where a first axis direction of the touch panel has N first sensing lines and a second axis direction of the touch panel has M second sensing lines. The first transceiver is coupled to the N first sensing lines for scanning the N first sensing lines in the first axis direction of the touch panel. The second transceiver is coupled to the M second sensing lines for scanning the M second sensing lines in the second axis direction of the touch panel. The processor is coupled to the first transceiver and the second transceiver for detecting at least one first sensing line touched by at least one object according to a scanning result of the first transceiver, controlling the first transceiver to input at least one high frequency signal to the at least one first sensing line touched by the at least one object and controlling the second transceiver to input M low frequency signals to the M second sensing lines in the second axis of the touch panel, detecting M feedback signals of the M second sensing lines received by the second transceiver, and determining a position of at least one touch point according to the M feedback signals.

The present invention provides a touch control system with multi-touch detection functions. The touch control system utilize a first transceiver to scan whole first sensing lines in a first axis direction of a touch panel, and the processor to detect at least one first sensing line touched by at least one object according to a scanning result of the first transceiver. If the processor detects the at least one first sensing line touched by the at least one object, the first transceiver only inputs the at least one high frequency signal to the at least one first sensing line touched by the at least one object in the first axis direction of the touch panel, and a second transceiver inputs low frequency signals to second sensing lines in a second axis of the touch panel at the same time. The processor determines a position of the at least one touch point according to the low frequency signals coupled to the at least one high frequency signal. Thus, the present invention neither misjudges a ghost nor needs mass storages and a heavy data processing.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
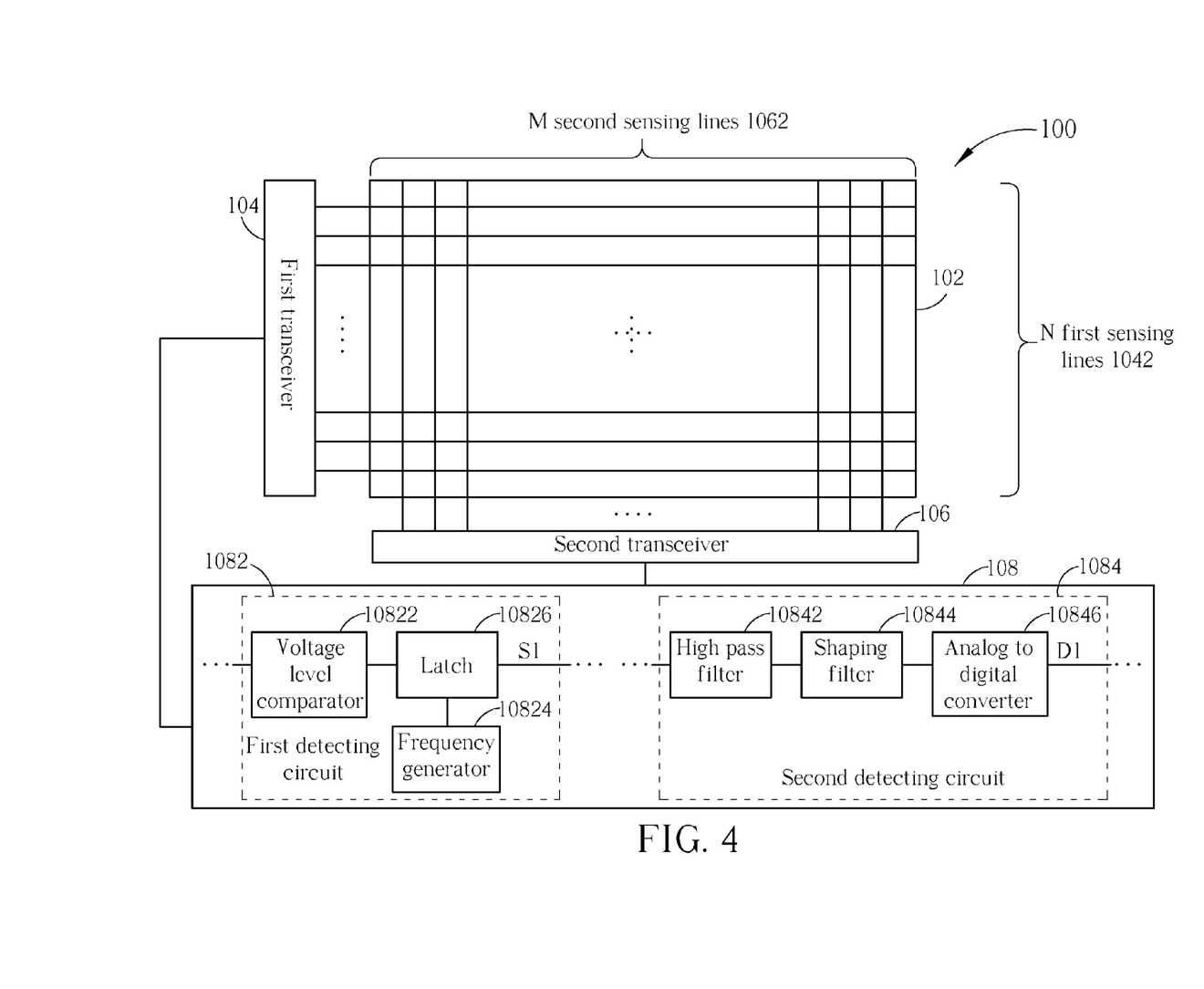
FIG. 4 is a diagram illustrating a touch control system with multi-touch detection functions according to an embodiment of the present invention.

Please refer to FIG. 4. FIG. 4 is a diagram illustrating a touch control system 100 with multi-touch detection functions according to an embodiment of the present invention. The touch control system 100 includes a touch panel 102, a first transceiver 104, a second transceiver 106, and a processor 108, where the processor 108 includes a first detecting circuit 1082 and a second detecting circuit 1084. The touch panel 102 is a projected capacitive touch panel. The touch panel 102 is used for being touched by at least one object, a first axis direction of the touch panel 102 has N first sensing lines 1042, and a second axis direction of the touch panel 102 has M second sensing lines 1062, where N is equal to M or not. The first transceiver 104 is coupled to the N first sensing lines 1042 and the processor 108 for transmitting first pulses to scan the N first sensing lines 1042 in the first axis direction of the touch panel 102, and receiving reflected signals generated by the N first sensing lines 1042. The second transceiver 106 is coupled to the M second sensing lines 1062 and the processor 108 for transmitting second pulses to scan the M second sensing lines 1062 in the second axis direction of the touch panel 102, and receiving M feedback signals of the second sensing lines 1062. The processor 108 is coupled the first transceiver 104 and the second transceiver 106 for detecting at least one first sensing line 1042 touched by at least one object according to an output result of the first detecting circuit 1082. The first detecting circuit 1082 includes a voltage level comparator 10822, a frequency generator 10824, and a latch 10826. The voltage level comparator 10822 is used for converting the reflected signals generated by the N first sensing lines 1042 to pulses corresponding to the reflected signals. The latch 10824 is coupled the voltage level comparator 10822 and the frequency generator 10826 for sampling the pulses outputted by the voltage level comparator 10822 according to the frequency supplied by the frequency generator 10826 to generate first signals S1. The second detecting circuit 1084 includes a high pass filter 10842, a shaping filter 10844, and an analog to digital converter 10846. In addition, the first axis direction is X axis direction and the second axis direction is Y axis direction shown in FIG. 4. However, in another embodiment of the present invention, the first axis direction is Y axis direction and the second axis direction is X axis direction.

Figure 5:
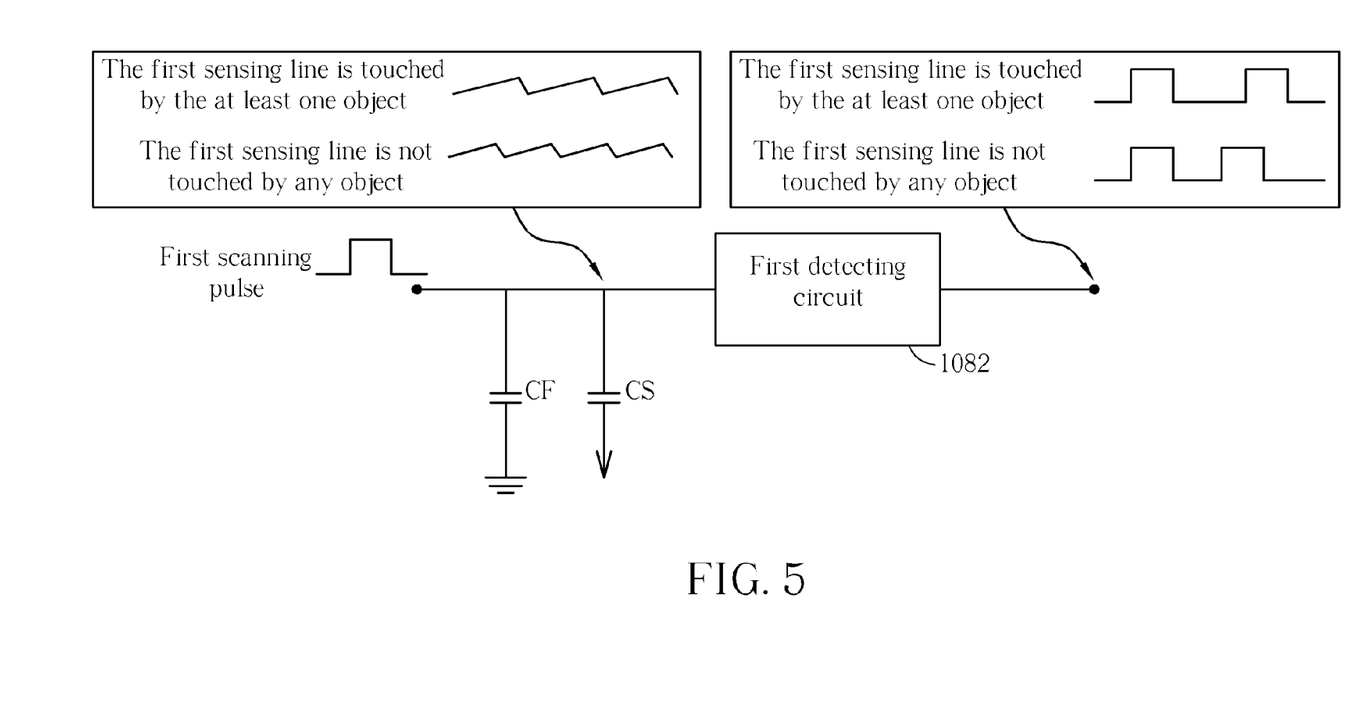
FIG. 5 is a diagram illustrating the processor determining a first sensing line touched by at least one object.

Please refer to FIG. 5. FIG. 5 is a diagram illustrating the processor 108 determining a first sensing line 1042 touched by at least one object. When the first sensing line 1042 is not touched by the at least one object (a capacitance CF of the at least one object being equal to zero), a duty cycle of the first signal S1 generated by the first detecting circuit 1082 is shorter because of a time constant generated by a capacitance CS of the first sensing line 1042 is decreased. When the first sensing line 1042 is touched by the at least one object (the capacitance CF of the at least one object being larger than zero), the duty cycle of the first signal S1 generated by the first detecting circuit 1082 is longer because of a time constant generated by the capacitance CS of the first sensing line 1042 adding the capacitance CF of the at least one object is increased. Therefore, the processor 108 can determine the first sensing line 1042 touched by the at least one object according the duty cycle of the first signal S1.

Figure 6:
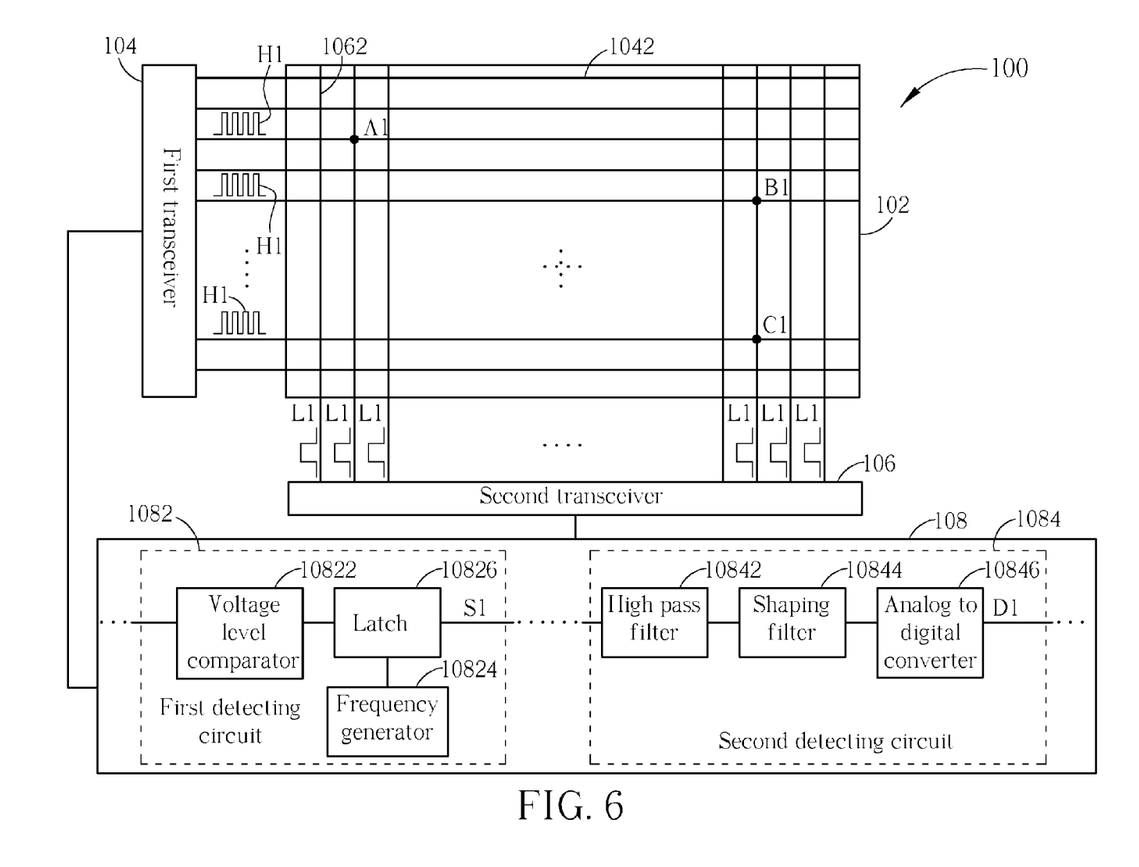
FIG. 6 is a diagram illustrating the processor controlling the first transceiver to input a high frequency signal to a first sensing line touched by at least one object, and controlling the second transceiver to input M low frequency signals to the M second sensing lines in the second axis direction.

Please refer to FIG. 6. FIG. 6 is a diagram illustrating the processor 108 controlling the first transceiver 104 to input a high frequency signal H1 to a first sensing line 1042 touched by at least one object, and controlling the second transceiver 106 to input M low frequency signals L1 to the M second sensing lines 1062 in the second axis direction. If the processor 108 determines a third first sensing line 1042, a fifth first sensing line 1042, and an (n-1)th first sensing line 1042 of the N first sensing lines 1042 are touched by objects A1, B1, and C1 respectively, the processor 108 controls the first transceiver 104 to input the high frequency signals H1 to the third first sensing line 1042, the fifth first sensing line 1042, and the (n-1)th first sensing line 1042, and controls the second transceiver 106 to input the M low frequency signals L1 to the M second sensing lines 1062 in the second axis direction of the touch panel 102. The M feedback signals are formed by coupling the M low frequency signals with the high frequency signals H1. The high pass filter 10842 is used for filtering the M low frequency signals L1 of the M feedback signals received by the second transceiver 106 through the M second sensing lines 1062. The shaping filter 10844 is coupled to the high pass filter 10842 for shaping M output signals of the high pass filter 10842. The analog to digital converter 10846 is coupled to the shaping filter 10844 for converting M output signals of the shaping filter 10844 to M digital signals D1 corresponding to the M output signals of the shaping filter 10844. The processor 108 can determine positions of touch points touched by the objects A1, B1, and C1 according to the M digital signals D1.

Figure 7:
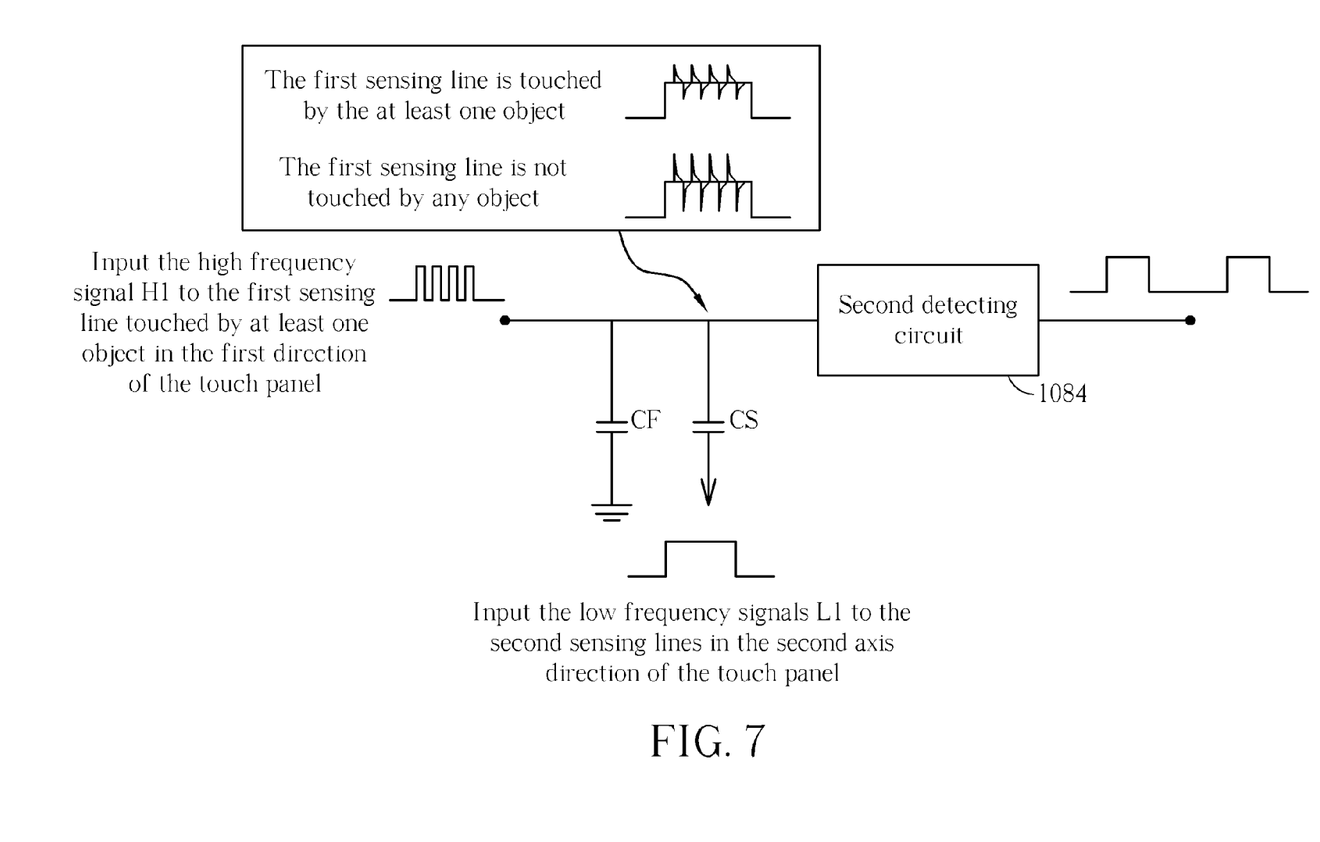
FIG. 7 is a diagram illustrating a feedback signal of the second sensing line touched by at least one object and a feedback signal of the second sensing line without any object touching.

Please refer to FIG. 7. FIG. 7 is a diagram illustrating a feedback signal of the second sensing line 1062 touched by at least one object and a feedback signal of the second sensing line 1062 without any object touching. Because the feedback signal is formed by the low frequency signal L1 coupled to the high frequency signal H1, a partial energy of the high frequency signal H1 is took away when the second sensing line 1062 is touched by the at least one object, resulting in an amplitude of the coupling high frequency signal of the feedback signal being smaller. If the second sensing line 1062 is touched by more than one object, the amplitude of the coupling high frequency signal of the feedback signal is further smaller according to the above operational principle, so that the digital signal D1 corresponding to the feedback signal varies with the coupling high frequency signal. As shown in FIG. 6, a second sensing line 1062 touched by the object A1, and an (M-2)th second sensing line 1062 touched by the objects B1, C1, so the processor 108 can determine the second sensing line 1062 touched by the object A1, and the (M-2)th second sensing line 1062 touched by the objects B1, C1 according to the digital signals D1 converted by the analog to digital converter 10846.

Figure 8:
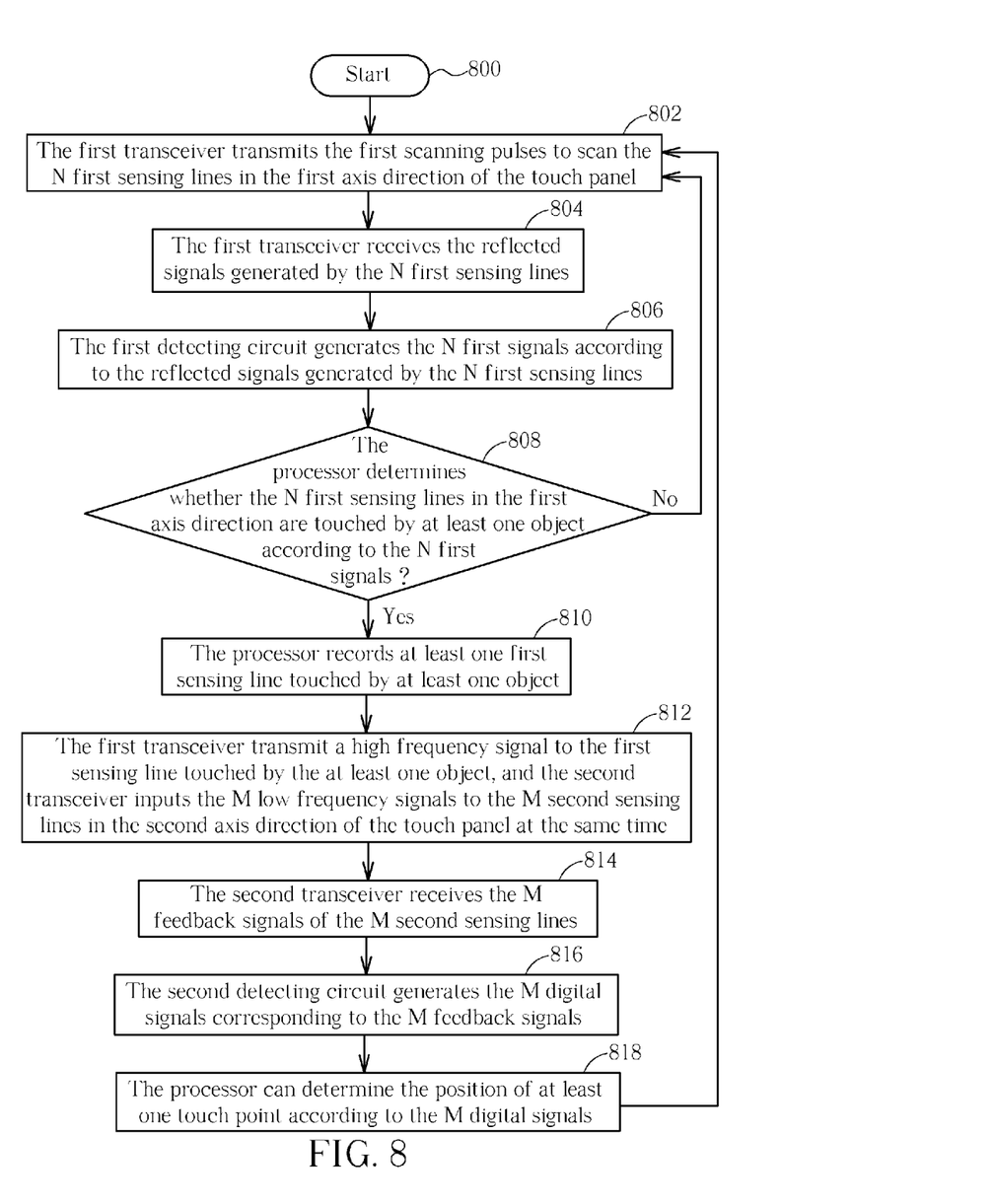
FIG. 8 is a flowchart illustrating a method of detecting multi-touch input according to another embodiment of the present invention.

Please refer to FIG. 8. FIG. 8 is a flowchart illustrating a method of detecting multi-touch input according to another embodiment of the present invention. The method in FIG. 8 is illustrated with touch control system 100 in FIG. 4. Detailed steps are as follows:

Step 800: Start.

Step 802: The first transceiver 104 transmits the first pulses to scan the N first sensing lines 1042 in the first axis direction of the touch panel 102.

Step 804: The first transceiver 104 receives the reflected signals generated by the N first sensing lines 1042.

Step 806: The first detecting circuit 1082 generates the N first signals S1 according to the reflected signals generated by the N first sensing lines 1042.

Step 808: The processor 108 determines whether the N first sensing lines 1042 in the first axis direction are touched by at least one object according to the N first signals S1? If yes, go to Step 810; if no, go to Step 802.

Step 810: The processor 108 records at least one first sensing line 1042 touched by at least one object.

Step 812: The first transceiver 104 transmit a high frequency signal H1 to the first sensing line 1042 touched by the at least one object, and the second transceiver 106 inputs the M low frequency signals L1 to the M second sensing lines 1062 in the second axis direction of the touch panel 102 at the same time.

Step 814: The second transceiver 106 receives the M feedback signals of the M second sensing lines 1062.

Step 816: The second detecting circuit 1084 generates the M digital signals D1 corresponding to the M feedback signals.

Step 818: The processor 108 can determine a position of at least one touch point according to the M digital signals D1; go to Step 802.

In Step 808, the processor 108 determines whether at least one first sensing line 1042 of the N first sensing lines 1042 is touched by at least one object according to duty cycles of the N first signals S1. In Step 812, the first transceiver 104 only transmits the high frequency signal H1 to the first sensing line 1042 touched by the at least one object, and the second transceiver 106 inputs the M low frequency signals L1 to the M second sensing lines 1062 in the second axis direction of the touch panel 102 at the same time. In Step 814, the M feedback signals of the M second sensing lines 1062 are formed by the M low frequency signals coupled to the at least one high frequency signal H1. In Step 816, the second detecting circuit 1084 generates the M digital signals D1 corresponding to the M feedback signals according to the M feedback signals, where the digital signal D1 varies with number of objects touching the second sensing line 1062. In Step 818, the processor 108 can determine the position of the at least one touch point according to the M digital signals D1.

To sum up, the touch control system with multi-touch detection functions and method of detecting multi-touch input utilize the first transceiver to scan the whole first sensing lines in the first axis direction of the touch panel, and the processor to detect the at least one first sensing line touched by the at least one object according to the scanning result of the first transceiver. If the processor does not detect the at least one first sensing line touched by the at least one object, the first transceiver repeatedly scans the whole first sensing lines in the first axis direction of the touch panel. If the processor detects the at least one first sensing line touched by the at least one object, the first transceiver inputs the at least one high frequency signal to the at least one first sensing line touched by the at least one object in the first axis direction of the touch panel, and the second transceiver inputs the low frequency signals to the second sensing lines in the second axis of the touch panel at the same time. The processor determines the position of the at least one touch point according to the low frequency signals coupled to the at least one high frequency signal. Thus, the present invention neither misjudges a ghost nor needs mass storages and heavy data processing.

Those skilled in the art will readily observe that numerous modifications and alterations of the device and method may be made while retaining the teachings of the invention.

What is claimed is:

1. A touch control system with multi-touch detection functions, the touch control system comprising:
   a touch panel for being touched by at least one object, a first axis direction of the touch panel having N first sensing lines and a second axis direction of the touch panel having M second sensing lines;
   a first transceiver coupled to the N first sensing lines for scanning the N first sensing lines in the first axis direction of the touch panel;
   a second transceiver coupled to the M second sensing lines for scanning the M second sensing lines in the second axis direction of the touch panel; and
   a processor coupled to the first transceiver and the second transceiver for detecting at least one first sensing line touched by at least one object according to a scanning result of the first transceiver, controlling the first transceiver to input at least one high frequency signal to the at least one first sensing line touched by the at least one object and controlling the second transceiver to input M low frequency signals to the M second sensing lines in the second axis of the touch panel, detecting M feedback signals of the M second sensing lines received by the second transceiver, and determining a position of at least one touch point according to the M feedback signals.

2. The touch panel of claim 1, wherein the touch panel is a projected capacitive touch panel.

3. The touch panel of claim 1, wherein the M feedback signals are formed by the M low frequency signals coupled to the at least one high frequency signal.

4. The touch panel of claim 1, wherein N is equal to M.

5. The touch panel of claim 1, wherein N is not equal to M.

6. The touch panel of claim 1, wherein the processor comprises:
   a first detecting circuit comprising:
      a voltage level comparator for converting a reflected signal generated by the at least one first sensing line to a pulse corresponding to the reflected signal;
      a frequency generator for providing a frequency; and
      a latch coupled to the voltage level comparator and the frequency generator for sampling the pulse according to the frequency; and
   a second detecting circuit comprising:
      a high pass filter for filtering the M low frequency signals of the M feedback signals;
      a shaping filter coupled to the high pass filter for shaping an output signal of the high pass filter; and
      an analog to digital converter coupled to the shaping filter for converting an output signal of the shaping filter to a digital signal corresponding to the output signal of the shaping filter.

* * * * *